US006989937B2

(12) United States Patent
Schauss

(10) Patent No.: US 6,989,937 B2
(45) Date of Patent: Jan. 24, 2006

(54) HIGH-APERTURE PROJECTION LENS

(75) Inventor: Udo Schauss, Waldböckelheim (DE)

(73) Assignee: Jos. Schneider Optische Werke GmbH, (DE)

( * ) Notice: Subject to any disclaimer, the term of this patent is extended or adjusted under 35 U.S.C. 154(b) by 1 day.

(21) Appl. No.: 10/868,941

(22) Filed: Jun. 17, 2004

(65) Prior Publication Data

US 2004/0257676 A1 Dec. 23, 2004

(30) Foreign Application Priority Data

Jun. 20, 2003 (DE) ................................ 103 28 094

(51) Int. Cl.
*G02B 3/00* (2006.01)

(52) U.S. Cl. ...................... 359/649; 359/708; 359/713; 359/737; 359/760

(58) Field of Classification Search ........ 359/649–651, 359/740, 760, 757, 708, 713, 737
See application file for complete search history.

(56) References Cited

U.S. PATENT DOCUMENTS

| | | | | |
|---|---|---|---|---|
| 6,795,255 | B2 * | 9/2004 | Reinecke et al. | 359/755 |
| 6,903,804 | B2 * | 6/2005 | Otomo | 355/67 |
| 2001/0050819 | A1 * | 12/2001 | Ohno | 359/760 |
| 2003/0112525 | A1 * | 6/2003 | Reinecke et al. | 359/649 |

FOREIGN PATENT DOCUMENTS

EP 1 134 606 A1 9/2001

* cited by examiner

*Primary Examiner*—Evelyn A. Lester
(74) *Attorney, Agent, or Firm*—Buchanan Ingersoll, LLP

(57) ABSTRACT

A six-element cinema projection lens is described in front of which an aspherized plane-parallel plate is positioned on the screen side. This arrangement permits the cost-effective design of a cinema projection lens with a relative aperture of 1:1.7 having very good image-forming properties. The high relative aperture increases the light utilization and therefore leads to savings in energy and costs. Furthermore, the projection lens can be used both for cinemascope format and for widescreen format, the differences in brightness being compensated by a variable diaphragm.

4 Claims, 7 Drawing Sheets

HIGH-APERTURE PROJECTION LENS

This application claims priority to German Patent Application No. 103 28 094, filed on Jun. 20, 2003.

FIELD OF THE INVENTION

The invention relates to a high-aperture projection lens. More accurately, the invention relates to a projection lens having a relative aperture of at least 1:1.8. The main field of application of the invention is 35 mm cinema projection.

DESCRIPTION OF RELATED ART

Known projection lenses normally have a relative aperture of 1:1.9 to 1:2.5. However, it is known that lighting systems exist which require a higher aperture if as much light as possible is to be captured. The creation of a high-aperture projection lens requires the use of at least seven lens elements (EP 1 134 606 A 1) or the use of aspheric lenses made from glass, which are very expensive, in order to correct the spherical abberation.

SUMMARY OF THE INVENTION

It is an object of the invention to create a cost-effective cinema projection lens which ensures an excellent image formation efficiency even given a relative aperture of at least 1:1.8.

This object is achieved by the invention with the aid of the features of the independent claim. Advantageous embodiments of the invention are characterized in the dependent claims.

According to the invention, a projection lens is proposed having an optical axis and having a substantially plane-parallel plate.

Projection lenses are normally used for projecting a film onto a screen in a cinema auditorium. They are designed such that they project the film (object) in an enlarged fashion onto the screen (image).

Deviations from plane parallelism are formed in the substantially plane-parallel plate by thickening or thinning the plate in the direction of the optical axis. The substantially plane-parallel plate is therefore denoted as an "aspherized plane-parallel plate".

The deviations from plane parallelism are normally formed in a rotationally symmetrical fashion relative to the optical axis. This aspherization does not cause the plane-parallel plate effectively to become a further lens. It serves merely to make a slight correction of optical aberrations. Consequently, the deviations from plane parallelism are at most one part per thousand of the diameter of the plane-parallel plate, as a rule even only a few $\mu$m.

Such aspherized plane-parallel plates can be favourably produced by grinding and polishing a suitable plane-parallel plate.

The use of a weakly aspherized plane-parallel plate has the advantage, furthermore, that the aspheric surface can be measured very accurately by means of interferograms. It suffices in this case to view the interference pattern of the aspherized plane-parallel plate. Since the deviations from plane parallelism which are shaped in order to achieve the aspheric properties are formed with rotational symmetry relative to the optical axis, rings result in the interference pattern. As a rule, it suffices to count the interference rings for the purpose of evaluation. The hologram or compensation system typically used to check the aspheric properties of aspheric lenses can be eliminated, and this leads to an enormous reduction in costs.

The use of an aspherized plane-parallel plate permits the design of a projection lens having a large relative aperture of at least 1:1.8, typically 1:1.7—in conjunction with very good image-forming properties which are unchanged.

Xenon high-pressure lamps with a power of up to 7 kW are typically used for cinema projection. By contrast, it is possible by using the high-aperture projection lens according to the invention to achieve an equally bright image with the aid of only a 5 kW lamp, since it is of higher light-gathering power by approximately 40%—in part even more—compared with conventional projection lenses. This results in substantial savings in energy and costs.

In the field of cinematographic projection lenses, it is usual, based on the design according to the invention, to produce a range of a multiplicity of projection lenses of different focal length and thus different magnification. The individual lenses of such a range are adapted to the different screen sizes and projection distances. The focal lengths vary here as a rule in the range from approximately 50 millimetres up to approximately 90 mm and are usually implemented in steps of 2.5 mm to 5 mm in focal length difference.

As usual, the projection lens is constructed from a plurality of optical elements—as a rule lenses. The optical elements typically consist of the glasses or plastics which are customary for the construction of lenses and are selected with regard to their refractive index and their dispersion properties. Added to this is a suitable antireflection coating of the optical elements.

A projection lens serves the purpose of enlarged projection of an object—the film—onto an image—the image of the film produced on the screen. In a preferred embodiment of the invention, the aspherized plane-parallel plate forms the optical element arranged outermost on the image side. This design exhibits a very high measure of resolution and image-forming properties.

The inventive design of the projection lens permits the cost-effective production of a projection lens with a large relative aperture. The relative aperture is the focal length of the projection lens divided by the diameter of the exit pupil. It is the design by means of an aspherized plane-parallel plate which permits a projection lens with a relative aperture of at least 1:1.8 to be produced cost-effectively. Relative apertures of 1:1.9 to 1:2.5 are customary.

The main field of application of the invention is 35 mm cinema projection. Two formats are normally projected in cinema projection: firstly the 1:1.85 format (widescreen format) and secondly the cinemascope format, in which the projection lenses together with anamorphotic lenses produce the image with an extended width. The two film formats are illustrated schematically in FIG. 1. Since the area of an individual image on the film is approximately 55% greater in the cinemascope format than the area of the 1:1.85 format, the image produced in the cinemascope projection is too bright with reference to the image produced in the 1:1.85 projection.

The projection lens according to the invention therefore has a variable diaphragm in order to compensate the brightness differences which have had to be lived with up till now. This permits the projection lens according to the invention to be used both for widescreen and for cinemascope formats. The cinemascope format must be stopped down by 55%, that is to say by approximately half. This corresponds precisely to one stop number of classical optics. A relative aperture of 1:1.7 is reduced by the variable diaphragm to approximately 1:2.4 or 1:2.5. A relative aperture of 1:2 is reduced to 1:2.8 by means of the variable diaphragm.

An continuously adjustable iris diaphragm is preferably used for the variable diaphragm.

The projection lens according to the invention is a high-aperture, stop-down projection lens which preferably consists of six freestanding lenses between which air is therefore present; an aspherized plane-parallel plate is placed in front of them. The variable diaphragm is located between the first and second lenses on the image side.

In detail, the projection lens according to the invention has the following arrangement of the optical elements in the sequence from the enlarged image to the object:

the aspherized plane-parallel plate,
a first positive lens,
the variable diaphragm,
a second positive lens,
a third negative lens,
a fourth negative lens,
a fifth positive lens, and
a sixth positive lens.

The variable diaphragm is therefore arranged between the first and second positive lenses or, viewed from the image or from the screen, behind the first positive lens. In the case of projection lenses, an attempt is always to be made for the entrance or exit pupil to be located very far from the film plane, in order to capture as much light as possible from the illuminating device. In such a case, the optimum approach is likewise to locate the diaphragm very far from the film plane. Otherwise, stopping down would result in stronger vignetting.

By contrast with the prior art (EP 1 134 606 A1), which fundamentally operates with an expensive seven-element design, the proposed projection lens according to the is invention achieves a comparable imaging quality and resolution for a higher relative aperture with only six lens elements and a very cost-effective, weakly aspherized plane-parallel plate.

The following arrangement of optical elements in the sequence from the enlarged image to the object has proved to be particularly advantageous with respect to the image-forming properties and resolution:

the aspherized plane-parallel plate,
the first positive lens,
the variable diaphragm,
the second positive lens in the form of a meniscus lens,
the third negative lens in the form of a biconcave lens,
the fourth negative lens in the form of a biconcave lens,
the fifth positive lens in the form of a meniscus lens, and
the sixth positive lens in the form of a biconvex lens.

A meniscus lens is a lens in which the curvatures of the two lens surfaces point in the same direction.

It has emerged that the optical aberrations can largely be reduced with the aid of this design. The optical aberrations of the projection lens are therefore in a range which is no longer disturbing for the human eye, there being simultaneously a high resolution.

The quality of the projection lens therefore corresponds to the quality of the best customary projection lenses, but the luminous intensity is substantially higher. The lens according to the intention is therefore superior to the customary lenses in its technical properties. Since the production costs are also reduced by the use of an aspherized plane-parallel plate, an outstanding price/performance ratio results for the projection lens according to the invention.

BIEF DESCRIPTION OF THE DRAWINGS

The invention is explained in more detail below with the aid of exemplary embodiments which are illustrated diagrammatically in the figures. Identical reference numerals in the individual figures in this case denote identical elements. In detail:

DETAILED DESCRIPTION OF PREFERRED EMBODIMENTS

The surface of an aspheric lens can be described in general with the aid of the following formula:

$$z=\frac{Cy^2}{1+\sqrt{1-(1+k)\cdot C^2\,y^2}}+Dy^4+Ey^6+Fy^8+Gy^{10},$$

in which z specifies the sagitta (in mm) with reference to the plane perpendicular to the axis, that is to say the direction of the deviation from the plane perpendicular to the optical axis, that is say in the direction of the optical axis.

C specifies the so-called apex curvature. The apex curvature vanishes for a plane-parallel plate. It serves to describe the curvature of a convex or concave lens surface.

y specifies the distance from the optical axis (in mm). y is a radial coordinate k specifies the so-called cone constant, which plays no role here since k and C vanish.

D, E, F, G represent the so-called aspheric coefficients, which are the coefficients of a polynomial expansion of the function for describing the surface of the asphere. The aspheric coefficients are specified in each case for the following exemplary embodiments.

First Exemplary Embodiment

Figure 1:
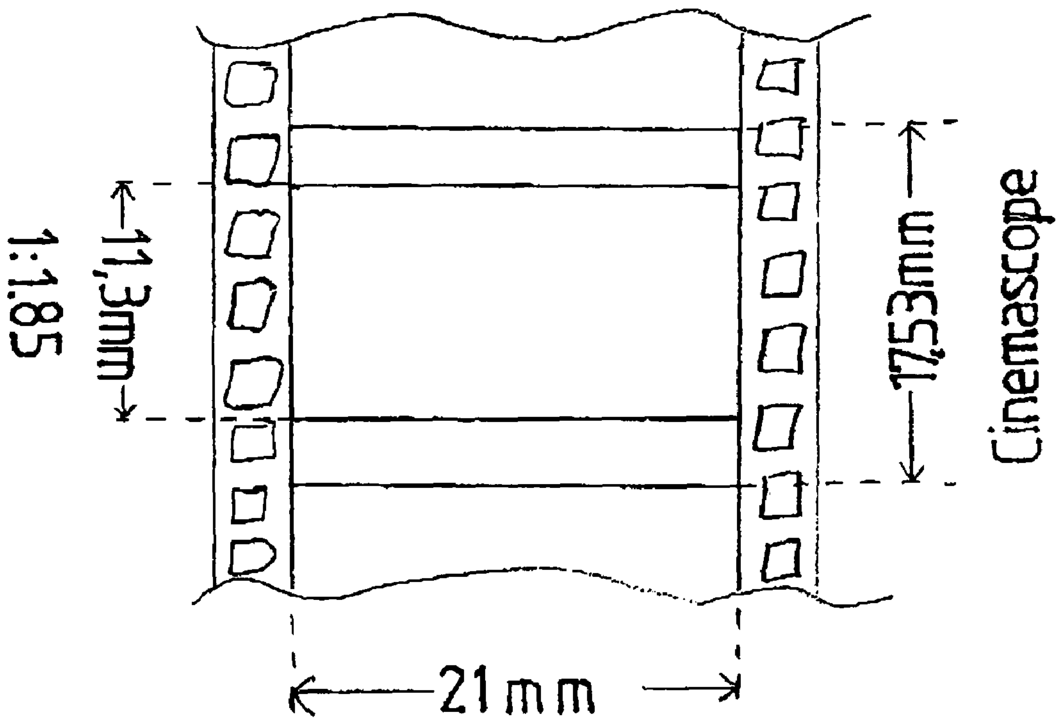
FIG. 1 shows a diagrammatic illustration of the two most common film formats: 1:1.85 format (widescreen format) and cinemascope format.
Figure 2:
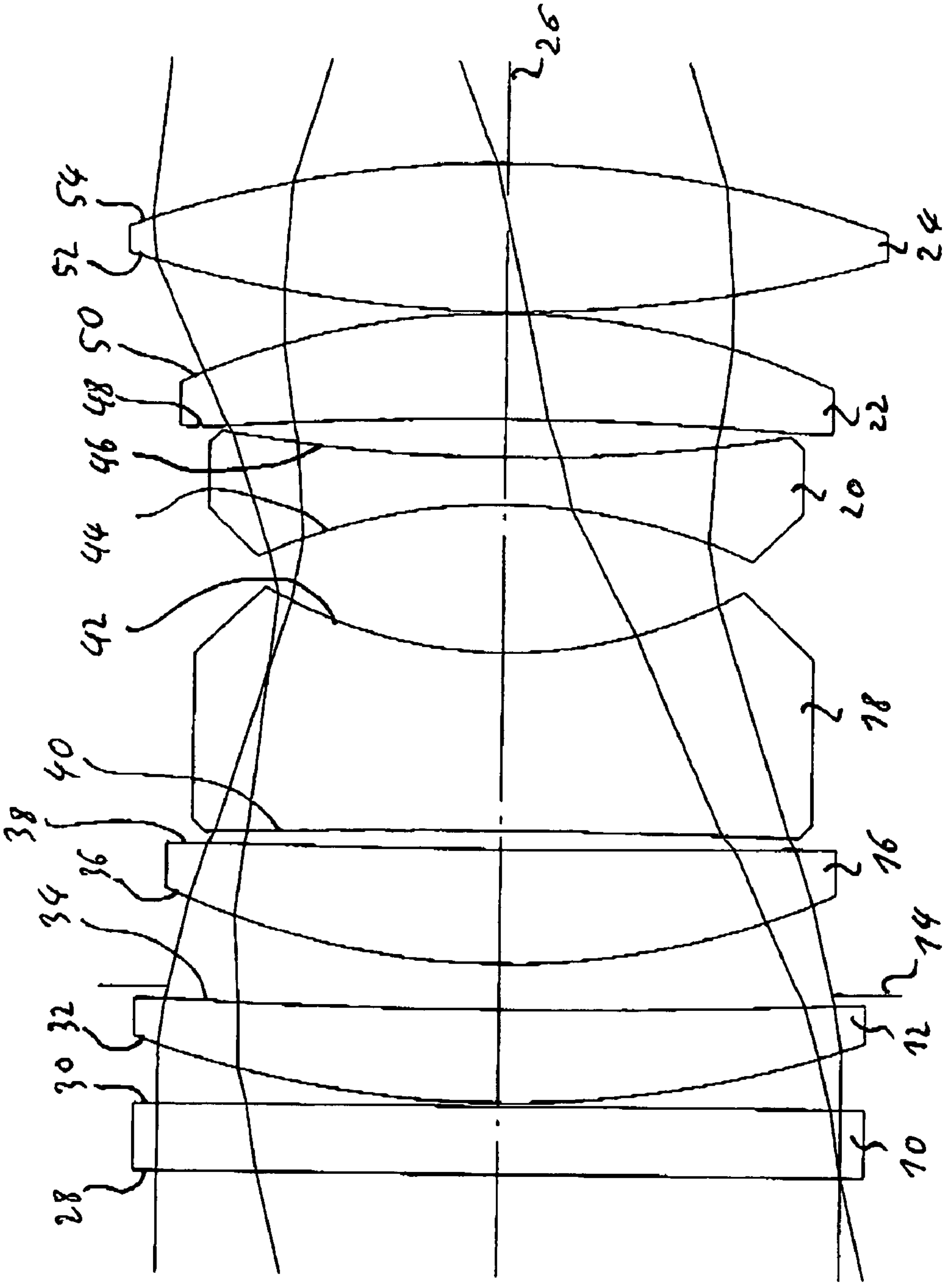
FIG. 2 shows a sectional view of the design of the projection lens in accordance with the first exemplary embodiment.

FIG. 2 shows the diagrammatic design of the projection lens in accordance with the first exemplary embodiment. This is a projection lens having a focal length of 60 mm and a relative aperture of 1:1.7.

In the illustration in accordance with FIG. 2, the screen or the enlarged image is located on the left, and the object or the film on the right. The projection lens in accordance with the first exemplary embodiment comprises the following elements in the sequence from the enlarged image to the object, that is to say from the left to right:

an aspherized plane-parallel plate 10,
a first positive lens 12,
a variable diaphragm 14,
a second positive lens in the form of a meniscus lens 16,
a third negative lens in the form of a biconcave lens 18,
a fourth negative lens in the form of a biconcave lens 20,
a fifth positive lens in the form of a meniscus lens 22, and
a sixth positive lens in the form of a biconvex lens 24.

The optical axis is denoted by 26. The precise data for the individual surfaces of the optical elements are to be found in the following table, together with the respectively associated reference numerals.

| Surface reference numeral | Radius/mm | Thickness/mm | Diaphragm distance/mm | Free diameter/mm | Refractive index or index of refraction ($n_e$) for 546 nm | Dispersion ($v_e$) for 546 nm |
|---|---|---|---|---|---|---|
| 28 | infinite (aspheric) | 2.000 | | 34.000 | 1.518726 | 64.0 |
| 30 | infinite | 0.200 | | 34.000 | 1.000000 | |
| 32 | 52.802 | 4.750 | | 34.000 | 1.758441 | 52.1 |
| 34 | 358.253 | 2.380 | 0.990 | 33.300 | 1.000000 | |
| 36 | 38.971 | 5.940 | | 31.000 | 1.758441 | 52.1 |
| 38 | 624.295 | 0.980 | | 29.200 | 1.000000 | |
| 40 | −477.944 | 9.250 | | 28.500 | 1.677654 | 31.9 |
| 42 | 23.153 | 7.700 | | 22.800 | 1.000000 | |
| 44 | −28.314 | 2.470 | | 23.600 | 1.677654 | 31.9 |
| 46 | 82.687 | 1.980 | | 27.300 | 1.000000 | |
| 48 | −188.841 | 5.470 | | 27.900 | 1.732350 | 54.5 |
| 50 | −37.095 | 0.100 | | 30.200 | 1.000000 | |
| 52 | 63.875 | 7.680 | | 35.000 | 1.732350 | 54.5 |
| 54 | −53.246 | 0.000 | | 35.400 | 1.000000 | |

The dispersion ($v_e$) is defined as $$v_e = \frac{n_e - 1}{n_{F'} - n_{C'}},$$

where $n_{F'}$ is the refractive index for 480 nm, and $n_{C'}$ is the refractive index for 643.8 nm.

The aspheric coefficients of the first surface 28 are

| | |
|---|---|
| C | 0 |
| D | $-0.93 \times 10^{-7}$ |

-continued

| | |
|---|---|
| E | $0.20 \times 10^{-9}$ |
| F | $-0.35 \times 10^{-12}$ |
| G | 0 |

As a rule, only one plate side, preferably the outer plate side 28, is aspherized, and not the inner plate side 30.

If the film to be imaged passes into the illuminating device from where it is projected onto the screen, it heats up under the intensive illumination. It warps when heated, to be precise the centre of the film is warped in the direction of the illuminating device, and the edges of the film are warped in the direction of the screen. The corners of the individual images are thereby moved forward as a rule by approximately 100–200 μm in the direction of the screen by comparison with the centre, typically by approximately 140 μm. In some projectors, the film is deliberately guided in a specified cambered shape for the purpose of better reproducibility of the camber. This is taken into account when designing the projection lens. The projection lens is optimized for imaging the cambered film.

The resolution and the image-forming properties of the projection lens are explained in more detail below in accordance with the first exemplary embodiment and with the aid of a few figures.

Figure 3:
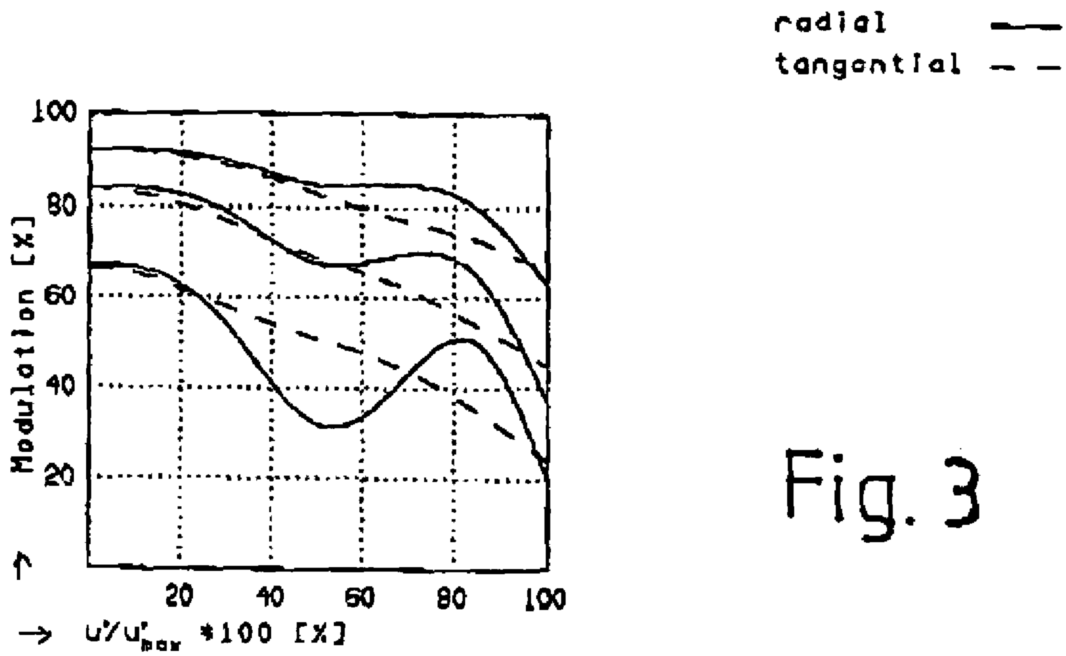
FIG. 3 shows the resolution of the projection lens in accordance with the first exemplary embodiment, for stop number 1.7.

FIG. 3 shows the resolution of the projection lens in accordance with the first exemplary embodiment. The resolution was calculated for a colour weighting which corresponds to the mean sensitivity of the human eye. Three examples were calculated: the upper two curves belong to the example with a spatial frequency of 20 pairs of lines per mm (LP/mm), the middle two curves belong to 40 LP/mm, and the lower two curves to 80 LP/mm. The continuous line shows in each case the resolution of radially running pairs of lines, and the dashed line the resolution of tangentially running pairs of lines. The x-axis indicates the relative deviation from the centre of the image to be enlarged. The modulation transfer function is illustrated on the y-axis for a relative aperture of 1:1.7. The imaging was carried out virtually to infinity. The resolution of the projection lens in accordance with the first exemplary embodiment corresponds to the resolution of very good projection lenses.

Figure 4:
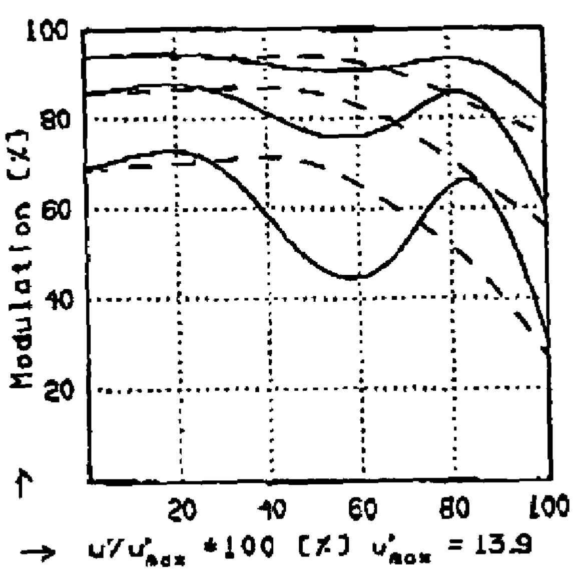
FIG. 4 shows the resolution of the projection lens in accordance with the first exemplary embodiment, for stop number 2.4.

FIG. 4 shows the resolution of the projection lens in accordance with the first exemplary embodiment for a partially closed diaphragm (stop number 2.4). Otherwise, FIG. 4 corresponds to FIG. 3.

Figure 5:
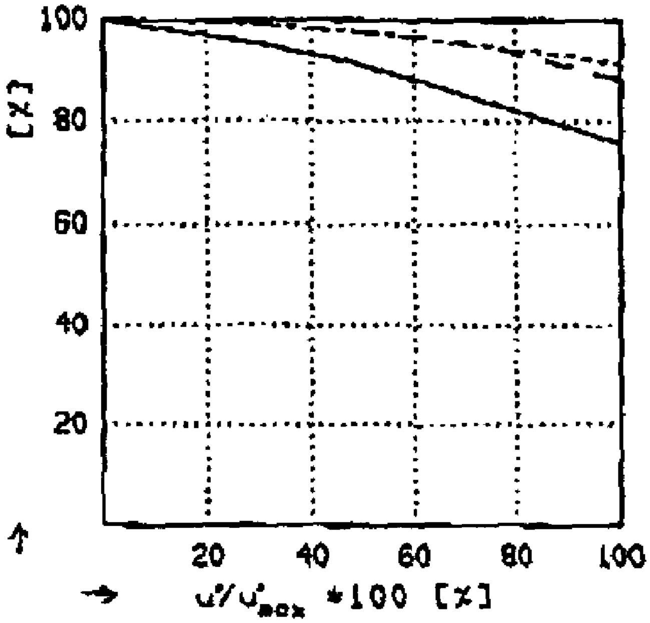
FIG. 5 shows the relative intensity of illumination (vignetting) of the edges of the enlarged image compared with the centre for the projection lens in accordance with the first exemplary embodiment.

FIG. 5 shows the relative intensity of illumination of the edges of the enlarged image compared with the centre for the projection lens in accordance with the first exemplary embodiment. The x-axis corresponds to the x-axis in accordance with FIG. 3. The continuous line was calculated for a stop number of 1.7, the dashed line for 2.0, and the dotted line for 2.4.

Figure 6:
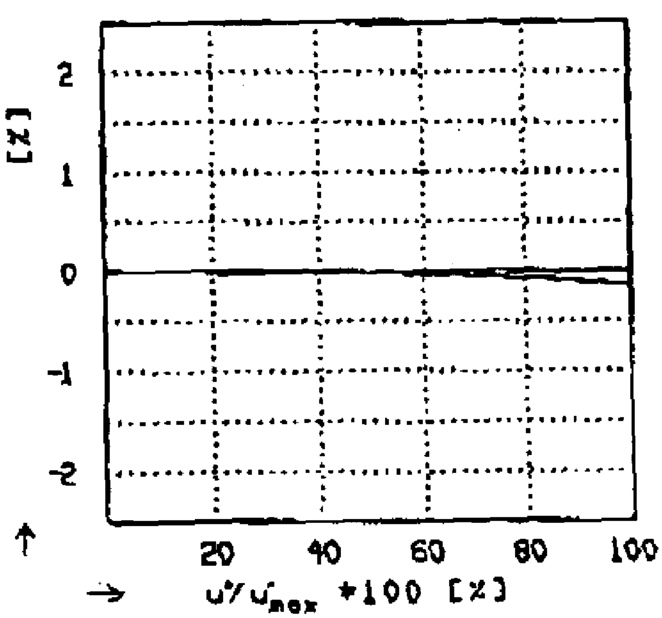
FIG. 6 shows the distortion for the projection lens in accordance with the first exemplary embodiment.

FIG. 6 shows the distortion for the projection lens in accordance with the first exemplary embodiment, in % of deviation from the ideal image format. A minimum cushion-shaped distortion which is not, however, perceptible to a viewer in the cinema, is in evidence.

Second Exemplary Embodiment

Figure 7:
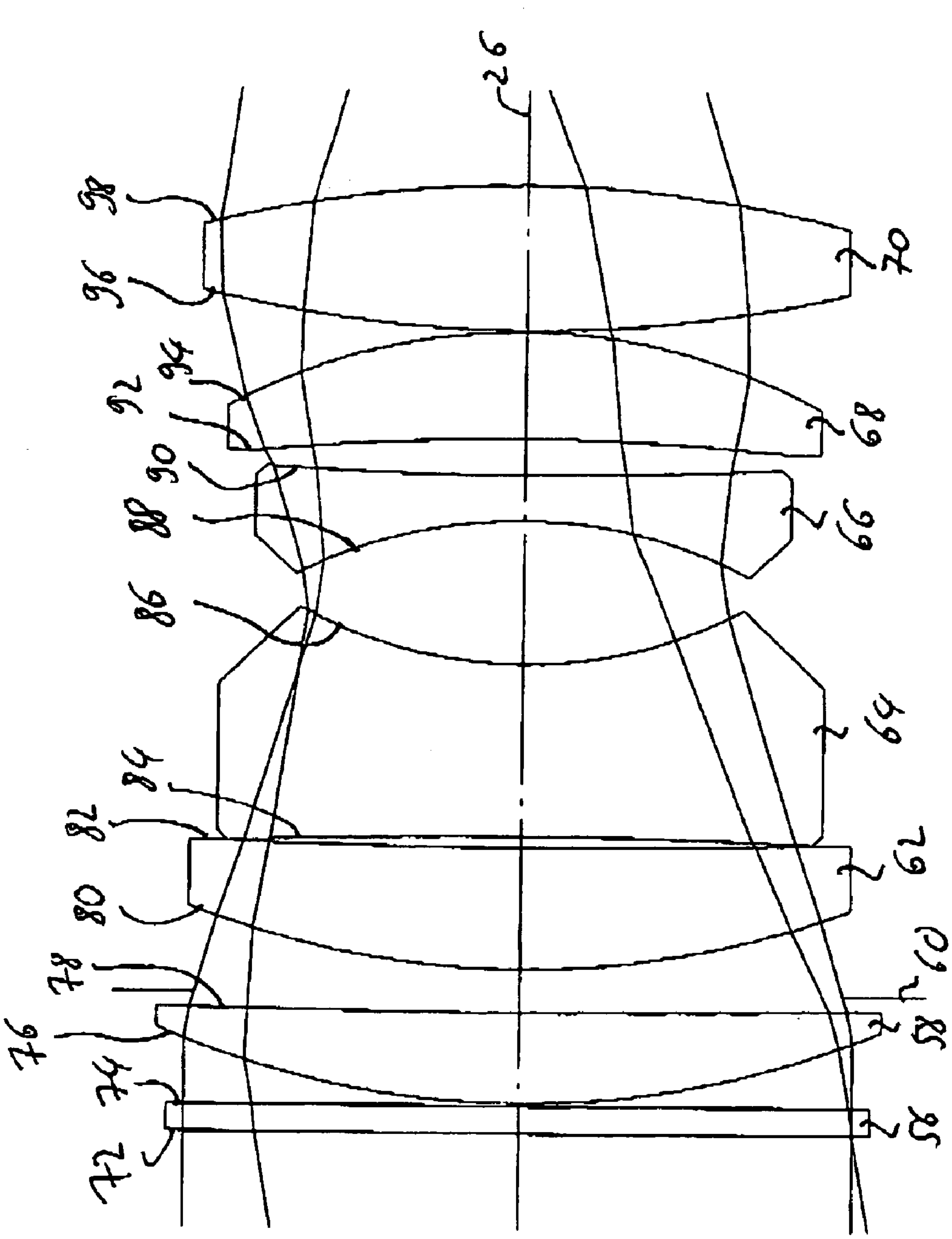
FIG. 7 shows a sectional view of the design of the projection lens in accordance with the second exemplary embodiment.

FIG. 7 shows the diagrammatic design of the projection lens in accordance with the second exemplary embodiment. This is a projection lens having a focal length of 82.5 mm and a relative aperture of 1:1.7.

In the illustration in accordance with FIG. 7, once again the screen or the enlarged image is located on the left, and the object or the film on the right. The projection lens in accordance with the second exemplary embodiment comprises the same optical elements as the projection lens in accordance with the first exemplary embodiment:

an aspherized plane-parallel plate 56, a first positive lens 58, a variable diaphragm 60, a second positive lens in the form of a meniscus lens 62, a third negative lens in the form of a biconcave lens 64, a fourth negative lens in the form of a biconcave lens 66, a fifth positive lens in the form of a meniscus lens 68, and a sixth positive lens in the form of a biconvex lens 70.

The optical axis is denoted by 26. The precise data for the individual surfaces of the optical elements are to be found in the following table, together with the respectively associated reference numerals.

| Surface reference numeral | Radius/mm | Thickiness/mm | Diaphragm distance/mm | Free diameter/mm | Refractive index or index of refraction ($n_e$) for 546 nm | Dispersion ($v_e$) for 546 nm |
|---|---|---|---|---|---|---|
| 72 | infinite (aspheric) | 2.000 | | 46.600 | 1.518726 | 64.0 |
| 74 | infinite | 0.200 | | 46.600 | 1.000000 | |
| 76 | 63.451 | 6.440 | | 48.100 | 1.758444 | 52.1 |
| 78 | 1023.382 | 3.180 | 1.321 | 47.300 | 1.000000 | |
| 80 | 62.544 | 8.900 | | 43.600 | 1.758444 | 52.1 |
| 82 | 562.587 | 0.860 | | 40.500 | 1.000000 | |
| 84 | −442.014 | 12.470 | | 39.800 | 1.677654 | 31.9 |
| 86 | 31.829 | 10.520 | | 30.000 | 1.000000 | |
| 88 | −33.125 | 3.380 | | 30.700 | 1.677654 | 31.9 |
| 90 | 283.488 | 2.710 | | 35.000 | 1.000000 | |
| 92 | −171.729 | 7.650 | | 36.300 | 1.732350 | 54.5 |
| 94 | −42.288 | 0.110 | | 39.000 | 1.000000 | |
| 96 | 92.950 | 10.490 | | 42.400 | 1.732350 | 54.5 |
| 98 | −85.084 | 0.000 | | 42.700 | 1.000000 | |

The aspheric coefficients of the first surface 72 are

| | |
|---|---|
| C | 0 |
| D | $0.699617 \times 10^{-7}$ |
| E | $-0.658553 \times 10^{-10}$ |
| F | $-0.715742 \times 10^{-13}$ |
| G | $-0.350000 \times 10^{-16}$ |

Figure 8:
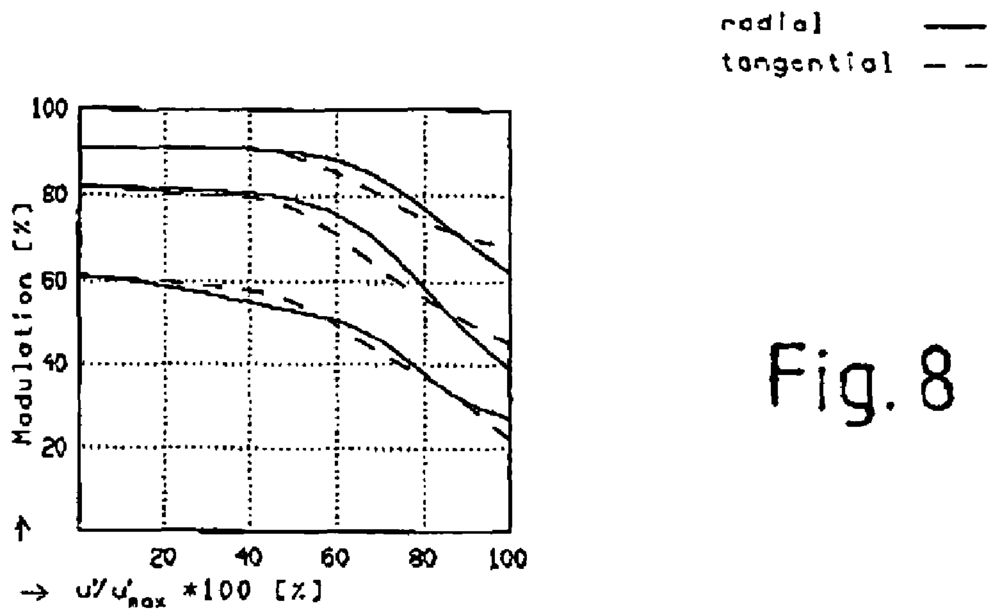
FIG. 8 shows the resolution of the projection lens in accordance with the second exemplary embodiment, for stop number 1.7.
Figure 9:
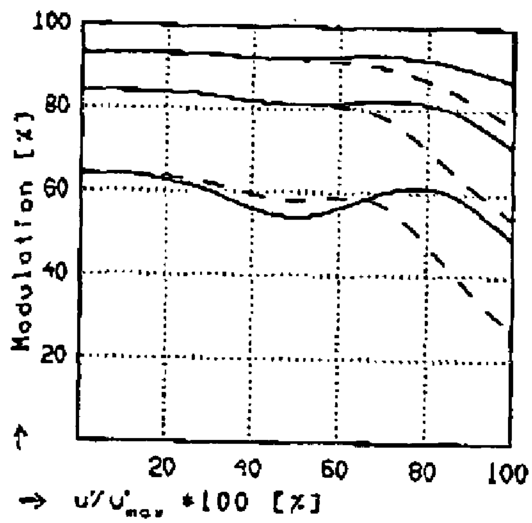
FIG. 9 shows the resolution of the projection lens in accordance with the second exemplary embodiment, for stop number 2.4.
Figure 10:
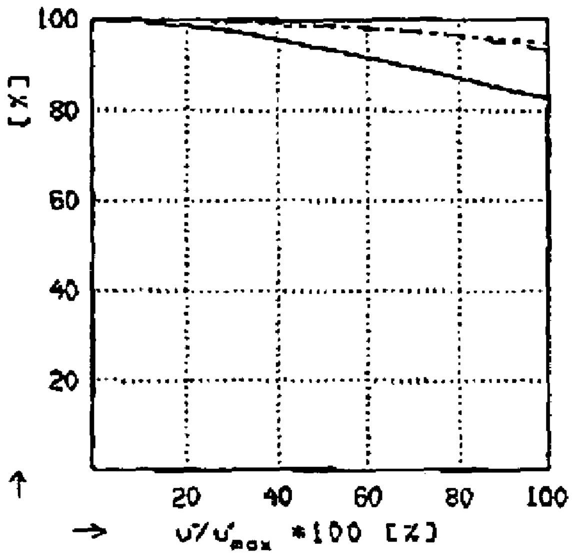
FIG. 10 shows the relative intensity of illumination (vignetting) in the image field compared with the centre of the projection lens in accordance with the second exemplary embodiment.
Figure 11:
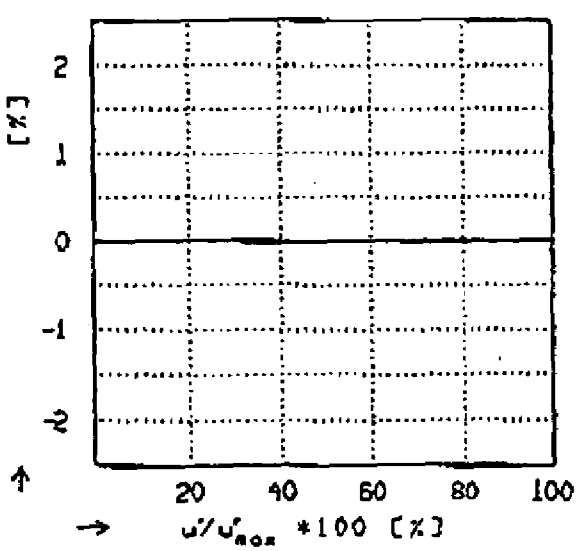
FIG. 11 shows the distortion for the projection lens in accordance with the second exemplary embodiment.

Of FIGS. 8 to 11:

FIG. 8 shows the resolution of the projection lens in accordance with the second exemplary embodiment, for stop number 1.7;

FIG. 9 shows the resolution of the projection lens in accordance with the second exemplary embodiment, for stop number 2.4;

FIG. 10 shows the relative intensity of illumination (vignetting) in the image field compared with the centre of the projection lens in accordance with the second exemplary embodiment; and FIG. 11 shows the distortion for the projection lens in accordance with the second exemplary embodiment.

They correspond to FIGS. 3 to 6 for the first exemplary embodiment.

A slight improvement in the image-forming properties, as was possible to expect given an enlargement of the focal length from 60 mm to 82.5 mm, can be seen.

What is claimed is:

1. Projection lens having an optical axis and having a substantially plane-parallel plate, a) in which deviations from plane parallelism are formed in the plate by thickening or thinning the plate in the direction of the optical axis (aspherized plane-parallel plate); and b) in which the following optical elements are arranged in the subsequently specified sequence from the enlarged image to the object;

the aspherized plane-parallel plate, a first positive lens, a second positive lens, a third negative lens, a fourth negative lens, a fifth positive lens, and a sixth positive lens.

2. Projection lens according to claim 1, characterized by a relative aperture of at least 1:1.8.

3. Projection lens according to claim 1, characterized by a variable diaphragm arranged between the first positive lens and the second positive lens.

4. Projection lens according to claim 1;

characterized by the following arrangement of the optical elements in the sequence from the enlarged image to the object:

the aspherized plane-parallel plate, the first positive lens, the variable diaphragm, the second positive lens in the form of a meniscus lens, the third negative lens in the form of a biconcave lens, the fourth negative lens in the form of a biconcave lens, the fifth positive lens in the form of a meniscus lens, and the sixth positive lens in the form of a biconvex lens.

* * * * *